United States Patent
Newman et al.

(10) Patent No.: US 6,274,043 B1
(45) Date of Patent: Aug. 14, 2001

(54) POROUS POLYTETRAFLUOROETHYLENE MEMBRANE

(75) Inventors: David Newman, Huntington Station; Franco Morizio, Mineola; Stanley Kidd, Westbury, all of NY (US)

(73) Assignee: Pall Corporation, East Hills, NY (US)

( * ) Notice: Subject to any disclaimer, the term of this patent is extended or adjusted under 35 U.S.C. 154(b) by 0 days.

(21) Appl. No.: 09/545,276

(22) Filed: Apr. 7, 2000

Related U.S. Application Data

(62) Division of application No. 09/056,384, filed on Apr. 7, 1998, now Pat. No. 6,103,172.

(51) Int. Cl.$^7$ ..................................................... B01D 71/36
(52) U.S. Cl. ............................... 210/500.36; 210/500.27; 428/316.6
(58) Field of Search ............................. 210/500.36, 651, 210/500.27; 264/288.8, 294; 428/315.5, 316.6, 515; 521/142; 156/212

(56) References Cited

U.S. PATENT DOCUMENTS

| | | |
|---|---|---|
| 3,497,256 | 2/1970 | Rosenblatt . |
| 3,556,161 | 1/1971 | Roberts . |
| 3,859,402 | 1/1975 | Bintliff et al. . |
| 3,890,417 | 6/1975 | Vallance . |
| 3,953,566 * | 4/1976 | Gore . |
| 3,962,153 * | 6/1976 | Gore . |
| 4,003,818 | 1/1977 | Juillard et al. . |
| 4,100,326 | 7/1978 | Somezawa et al. . |
| 4,153,661 | 5/1979 | Ree et al. . |
| 4,187,390 * | 2/1980 | Gore . |
| 4,196,070 | 4/1980 | Chao et al. . |
| 4,340,479 | 7/1982 | Pall . |
| 4,380,521 | 4/1983 | Moreno et al. . |
| 4,710,331 | 12/1987 | Nobuo et al. . |
| 4,728,394 | 3/1988 | Shinjou et al. . |
| 4,734,196 | 3/1988 | Kono et al. . |
| 4,762,657 | 8/1988 | Rogers et al. . |
| 4,795,559 | 1/1989 | Shinjou et al. . |
| 4,863,604 | 9/1989 | Lo et al. . |
| 4,873,033 | 10/1989 | Heckmann et al. . |
| 4,874,568 | 10/1989 | Chau et al. . |
| 4,973,609 * | 11/1990 | Browne . |
| 4,985,296 | 1/1991 | Mortimer, Jr. . |
| 5,167,890 | 12/1992 | Sasshofer et al. . |
| 5,188,734 | 2/1993 | Zepf . |
| 5,234,739 | 8/1993 | Tanaru et al. . |
| 5,238,735 | 8/1993 | Nagou et al. . |
| 5,358,678 | 10/1994 | Nakamura et al. . |
| 5,366,631 | 11/1994 | Adiletta . |
| 5,370,836 | 12/1994 | Yokoyama et al. . |
| 5,373,620 | 12/1994 | Zine . |
| 5,426,128 * | 6/1995 | Burger et al. . |
| 5,435,957 | 7/1995 | Degen et al. . |
| 5,476,589 | 12/1995 | Bacino . |
| 5,510,176 * | 4/1996 | Nakamura et al. . |
| 5,552,100 * | 9/1996 | Shannon et al. . |
| 6,103,172 * | 8/2000 | Newman et al. . |

FOREIGN PATENT DOCUMENTS

| | | |
|---|---|---|
| 0 343 247 | 11/1989 | (EP) . |
| 0 456 939 | 11/1991 | (EP) . |
| 0 633 053 | 1/1995 | (EP) . |
| 1081046 | 8/1967 | (GB) . |
| 1273718 | 5/1972 | (GB) . |

\* cited by examiner

*Primary Examiner*—Ana Fortuna
(74) *Attorney, Agent, or Firm*—Leydig, Voit & Mayer, Ltd.

(57) ABSTRACT

The present invention relates to microporous and ultrafine polytetrafluoroethylene (PTFE) membranes of high permeability, excellent mechanical strength, and good chemical inertness, and to methods for their preparation. According to the method of the present invention, a porous PTFE substrate having a first pore rating is compressed to provide a porous membrane having a second pore rating, wherein the second pore rating is smaller than the first pore rating. The PTFE substrate can be contacted with one or more fibrous sheets during the compression step, which is preferably performed by passing the substrate, and fibrous sheets, if appropriate, between two calender rolls. The resulting porous PTFE membrane then can optionally be stretched and/or sintered, and preferably has a water permeability of at least about 0.5 l/hr/m$^2$/kPa.

15 Claims, No Drawings

POROUS POLYTETRAFLUOROETHYLENE MEMBRANE

CROSS-REFERENCE TO RELATED APPLICATIONS

This patent application is a divisional of U.S. patent application Ser. No. 09/056,384 filed on Apr. 7, 1998, now U.S. Pat. No. 6,103,172.

TECHNICAL FIELD OF THE INVENTION

The present invention relates to porous polytetrafluoroethylene (PTFE) membranes and methods for their preparation.

BACKGROUND OF THE INVENTION

Porous membranes are often employed as semipermeable barriers between two or more miscible fluids. In these applications, the membranes control the transmission of components between the fluids, and in the absence of overriding intermolecular forces based on charge, magnetism, dipoles, etc., they can generally be thought of as acting like sieves. As such, fluid components smaller than pores of the membrane can travel from one membrane surface to the other, but substances larger than the pores are prevented from doing likewise. This function is exemplified by the use of membranes as filters to remove particles from liquids or gases.

If a membrane contains a range of pore sizes, the largest pore determines the largest and smallest fluid components that will pass through or be retained by the membrane, respectively. Membranes with maximum pore sizes smaller than about 0.02 $\mu$m are commonly referred to as ultrafine, while those with maximum pore sizes between about 0.02 $\mu$m and about 10 $\mu$m (more typically about 1 $\mu$m) are considered microporous. Such membranes are often used by the electronics and pharmaceutical industries to remove particulate impurities from fluids (i.e., liquids and gases), and for reasons of economics and convenience it is preferred that these filtrations be performed rapidly and reliably. Membrane permeability and strength are therefore properties that are almost as important as pore size.

It is difficult to produce strong, permeable, micro and ultrafine membranes, and it is particularly difficult to create such membranes from polytetrafluoroethylene (PTFE). This material has many attractive qualities for use in membrane applications, such as superior chemical inertness and high mechanical stability at a range of temperatures. Strong, highly porous PTFE membranes were first produced by about the 1970's, and their preparation is described in U.S. Pat. No. 3,953,566 (Gore) and U.S. Pat. No. 4,187,390 (Gore). The method described in these patents comprises two fundamental steps: (a) the rapid stretching of unsintered PTFE extrudates to create pores, and (b) heat treatment of the stretched material to increase the mechanical strength thereof.

Since these patents, two general strategies have dominated attempts to prepare strong, highly porous PTFE membranes with smaller pore sizes. One common strategy has been to adopt the basic method of the '566 patent, but to modify and optimize the individual steps thereof. For example, U.S. Pat. No. 5,476,589 (Bacino) discloses an improved protocol of transverse and longitudinal stretching of unsintered PTFE to provide thin PTFE membranes with maximum pore sizes reportedly as small as 0.125 $\mu$m.

The sintering level of the stretched PTFE also has been subject to variation. Maximum pore sizes allegedly as low as 0.3 $\mu$m are obtained when semisintered PTFE is stretched according to the method of U.S. Pat. No. 5,234,739 (Tanaru et al.), while maximum pore diameters allegedly as low as 0.052 $\mu$m are produced if two or more fused sheets of fully sintered PTFE are stretched as described in U.S. Pat. No. 5,510,176 (Nakamura et al.). However, the stretching of fully sintered PTFE is difficult to perform, as the resulting membrane can be fragile and easily damaged. Two advantages of the present inventive method are that porous PTFE membranes of any sintering level can be produced, and the inventive membranes possess excellent mechanical strength.

A second common strategy for preparing a porous PTFE membrane has been to use a pore-forming filler, such as NaCl, instead of using a stretching protocol such as described in the '566 patent. In these methods, the filler is mixed with particles of PTFE, the mixture is transformed into a thin film, and the filler is removed from the film (e.g., by washing with hot water, acids, etc. to dissolve the filler) to create pores. This procedure was used to prepare membranes with maximum pore sizes of at least 0.1 $\mu$m in U.S. Pat. No. 4,863,604 (Lo et al.).

The aforementioned procedures all require the execution of complex sequences, and the quality of the resulting membranes can vary considerably if the individual steps (e.g., heating, fusing, stretching, etc.) are not carefully performed. Moreover, the porous PTFE membranes prepared by these methods have maximum pore sizes larger than 0.05 $\mu$m.

There exists a need for microporous and ultrafine PTFE membranes of relatively high mechanical strength, permeability, and chemical inertness, and for methods of producing those membranes that is relatively simple and reproducible. The present invention provides such membranes and such methods. These and other advantages of the present invention, as well as additional inventive features, will be apparent from the description of the invention provided herein.

BRIEF SUMMARY OF THE INVENTION

The present invention relates to non-fused microporous and ultrafine polytetrafluoroethylene (PTFE) membranes of high permeability, excellent mechanical strength, and good chemical inertness, and to methods for their preparation. According to the method of the present invention, a porous PTFE substrate having a first pore rating is compressed to provide a porous membrane having a second pore rating, wherein the second pore rating is smaller than the first pore rating. The PTFE substrate can be contacted with one or more fibrous sheets during the compression step, which is preferably performed by passing the substrate, and fibrous sheets, if appropriate, between two calender rolls. The resulting porous PTFE membrane then can optionally be stretched and/or sintered, and preferably has a water permeability of at least about 0.5 l/hr/m$^2$/kPa (about 0.005 l/min/ft$^2$/psi).

DESCRIPTION OF THE PREFERRED EMBODIMENTS

The porous polytetrafluoroethylene (PTFE) membranes of the present invention and the methods for their preparation are described in detail hereinafter. According to the method of the present invention, a porous PTFE substrate having a first pore rating is compressed between two compression agents to provide a porous membrane having a second pore rating, wherein the second pore rating is smaller than the first pore rating.

The first and second pore ratings can be determined by measuring the titre reductions of the porous substrate and membrane, respectively, with respect to monodispersed latex beads. Monodispersed latex beads have diameters that are all substantially identical. At a minimum, the monodispersed latex beads have diameters that fall within a narrow range. For example, essentially all monodispersed 0.055 μm beads have a diameter of from about 0.050 μm to about 0.060 μm.

The titre reduction of a filtration medium with respect to a particular particle, e.g., 0.055 μm monodispersed beads, is determined by filtering an influent containing a known number of those particles, and counting the number of the particles that pass through the filtration medium into the effluent. A filtration medium that prevents 99.9% of 0.055 μm monodispersed beads from entering the effluent is said to have a titre reduction of $10^3$ (99.9% removal) with respect to 0.055 μm monodispersed beads. For the purposes of the present invention, the first and second pore ratings are defined as the diameters of the smallest monodispersed beads for which each of the porous substrate and membrane, respectively, has a titre reduction of $10^3$ (99.9% removal).

Another measure of pore size is the $K_L$ of the filter medium. The $K_L$, which is inversely proportional to the effective pore diameter, is the applied air pressure at which a liquid used to wet the filter medium, e.g., isopropyl alcohol, begins to be forced from the pores of the medium. A porous PTFE membrane prepared according to the method of the present invention typically has an increased $K_L$ compared to the porous substrate from which it was prepared.

In addition to its pore rating (e.g., as measured by titre reduction and $K_L$), several other physical properties of the porous PTFE substrate are altered when it is compressed according to the present inventive method. For example, the permeability of the porous substrate is generally reduced, while its mechanical stability is, surprisingly, often improved.

The delta P (ΔP), Gurley value, and water flow are values associated with the permeability of a filtration medium. The pressure drop that occurs across a filtration medium when it is subjected to a constant airflow is known as the delta P. The ΔP's of the present invention are measured at an airflow rate of about 8.5 meters per minute (about 28 feet/minute). Delta P is inversely proportional to permeability, and typically increases when a porous substrate is compressed according to the method of the present invention. The Gurley value, like ΔP, is a measure of the filtration medium's resistance to airflow, is inversely proportional to permeability, and is generally higher in the porous membranes prepared via the present inventive method compared to the corresponding uncompressed porous substrates. The water flow of the filtration medium is determined by measuring the rate at which water flows through the medium when subjected to a constant pressure. It is directly proportional to permeability, and generally decreases when a porous substrate is compressed according to the method of the present invention.

The mechanical stability of a filtration medium can be determined by measuring any changes in its physical properties (e.g., size, permeability, etc.) that occur when it is subjected to a stressful environment (i.e., heat, reactive chemical, fluid with low surface tension, etc.). For instance, heating porous PTFE thin films at temperatures at or above about 100° C. can cause them to shrink by about 50% or more. Surprisingly, when the same porous thin films are compressed according to the present inventive method, the resulting porous PTFE membranes shrink by less than about 5% under the same conditions.

The aforementioned effects on the physical properties of a porous PTFE substrate when it is compressed according to the method of the present invention can be summarized as follows: compression generally causes a reduction in pore size, a decrease in permeability, and an increase in mechanical stability.

Porous PTFE Membrane

For many applications, such as fluid filtration, it is desirable to employ porous PTFE membranes with relatively small pores, relatively high permeability, and relatively high mechanical strength. The present invention provides such membranes.

Permeability, pore size, and mechanical strength can be quantitatively described using the physical properties mentioned above (i.e., titre reduction, $K_L$, ΔP, Gurley value, water flow, and amount of shrinkage when heated). The preferred, more preferred, and most preferred values for these physical properties for membranes in accordance with the present invention are set forth in Table 1. It is to be understood that these values are not absolute limits, i.e., the physical properties of a membrane in accordance with the present invention are not restricted to the values set forth in Table 1. Moreover, for the purposes of describing the present invention, these physical properties are considered to be independent of each other, i.e., a membrane in accordance with the present invention can have one or more physical properties within the ranges set forth in Table 1, but one or more other physical properties outside of these ranges. Particularly desirable membranes in accordance with the present invention will possess physical properties which are all within the ranges set forth in Table 1.

TABLE 1

Preferred physical properties of a porous PTFE membrane according to the present invention.

| Property | Preferred Value | More Preferred Value | Most Preferred Value |
| --- | --- | --- | --- |
| Pore Rating (μm) | ≦0.5 | ≦0.05 | ≦0.03 |
| Titre Reduction with respect to 0.055 μm monodispersed beads (% removal) | ≧$10^2$ (99%) | ≧$10^3$ (99.9%) | ≧$10^4$ (99.99%) |
| ΔP at 8.5 m/min (kPa) | ≦100 | ≦80 | ≦60 |
| Water Flow (1/hr/m$^2$/kPa) | ≧0.5 | ≧5 | ≧15 |
| Gurley Value (sec/100 ml) | ≦500 | ≦250 | ≦175 |
| $K_L$ (kPa) | ≧250 | ≧350 | ≧450 |
| Reduction in size when heated for two hours at 100° C. (% shrinkage) | ≦25 | ≦10 | ≦5 |

The method of the present invention allows for the aforementioned physical properties to be optimized for specific applications in a simple, predictable manner. For example, the PTFE substrate can be contacted with one or more fibrous, preferably non-woven, sheets during the compression step, which is preferably performed by passing the substrate and fibrous sheets between two calender rolls. The physical properties of the fibrous sheets and the processing conditions associated with the calendering step impact the physical properties of the resulting membrane (e.g., pore rating, permeability, etc.). These properties can be varied still more by stretching and/or sintering the compressed, porous PTFE membrane to further improve its permeability and/or mechanical stability, respectively.

A preferred porous membrane of the present invention has a titre reduction of at least about $10^3$ when challenged with 0.055 µm monodispersed beads, and a water permeability of at least about 10 l/hr/m²/kPa (about 0.1 l/min/ft²/psi).

Porous membranes of the present invention can be used for any suitable purpose. In particular, the porous membranes can be used, for example, as fluid filters in the electronics and pharmaceutical industries.

Porous PTFE Substrate

There are few restrictions with respect to the choice of the porous PTFE substrate that is compressed. The porous substrate can be prepared in any suitable manner, i.e., the tetrafluoroethylene monomers, for example Teflon 6A polytetrafluoroethylene, can be polymerized using any suitable method (e.g., dispersion, emulsion, or suspension polymerization), the polymer can be left unsintered or sintered to any level, and pores can be introduced in any suitable fashion (e.g., by stretching and/or via the use of a pore-forming filler). Thin porous films of PTFE are especially suitable substrates, and methods for the preparation of such films are disclosed in U.S. Pat. No. 3,953,566 (Gore), U.S. Pat. No. 4,187,390 (Gore), U.S. Pat. No. 5,476,589 (Bacino), U.S. Pat. No. 5,234,739 (Tanaru et al.), U.S. Pat. No. 5,510,176 (Nakamura et al.), and U.S. Pat. No. 4,863,604 (Lo et al.). The preparation methods described in the '566 and '390 patents are particularly preferred. A suitable process for the production of a porous article of manufacture of a polymer of tetrafluoroethylene, to be used as a substrate, comprises expanding a shaped article consisting essentially of highly crystalline poly(tetrafluoroethylene) made by a paste-forming extrusion technique, after removal of lubricant, by stretching said unsintered shaped article at a rate exceeding about 10% per second and maintaining said shaped article at a temperature between about 35° C. and the crystalline melt point of said tetrafluoroethylene polymer during said stretching. Thin films of porous polytetrafluoroethylene suitable for use in the present invention are available from commercial sources.

The method of the present invention is particularly advantageous when performed using PTFE substrates whose physical properties-fall within the ranges set forth in Table 2. While porous substrates conforming to the ranges set forth in Table 2 are particularly useful in the method of the present invention, it is to be understood that the ranges are not absolute limits, and that substrates with one or more (or even all) properties outside of these ranges also can be used. Particularly desirable substrates will possess physical properties which are all within the ranges set forth in Table 2.

TABLE 2

Preferred properties of porous PTFE substrates.

| Property | Preferred Range | More Preferred Range |
|---|---|---|
| Thickness (µm) | 5–200 | 10–100 |
| Pore Rating (µm) | 0.03–1.5 | 0.03–0.1 |
| Pressure Drop at 8.5 m/min airflow (kPa) | 5–75 | 15–45 |
| Water Flow (l/hr/m²/kPa) | 1–100 | 10–50 |
| Titre Reduction with respect to 0.055 µm monodispersed beads (% removal) | $0–10^3$ (0–99.9%) | $10^1–10^3$ (90–99.9%) |

Compression Agents

According to the method of the present invention, the porous PTFE substrate is compressed between two compression agents, for instance, the plates of a machine press, or the rolls of a calender. It is preferred that both of the compression agents be smooth, though according to the present invention one or both of the compression agents can also be textured, provided that they are free of projections or other unevenness of surface that would cause the PTFE substrate to be punctured during compression.

It is further preferred that the compression agents be non-deformable. By non-deformable is meant that the compression agents be composed of materials that resist deformation when contacted with the PTFE substrate and/or fibrous sheet. Such materials include metals, plastics, and graphite. Suitable metals include steel, titanium, iron, nickel, and chromium, while suitable plastics include polyurethanes, polyolefins, and polyamides. In a highly preferred embodiment of the present invention, the porous substrate is compressed by calendering it between two rolls, one composed of stainless steel, and the other of a high durometer polyurethane, such as Beloit Supertex® 90.

The PTFE substrate can be compressed while it is at ambient or elevated temperature, and in the latter case it is sometimes convenient to warm the substrate during the compression step by heating one or both of the compression agents. For instance, calender rolls can be heated by circulating a heated fluid such as oil or water within the rolls. Increasing the temperature of the PTFE substrate makes it easier to compress, which allows this operation to be performed more rapidly than at lower temperatures. Heating the substrate can also affect the physical properties of the porous membrane produced (e.g., heating the substrate can decrease the pore rating of the resulting membrane). According to the method of the present invention, a suitable temperature at which the substrate can be compressed is at least about 20° C., more preferably at least about 40° C., and most preferably at least about 80° C. For example, the substrate can be heated by increasing the temperature of one or both of the compression agents to at least about 20° C., more preferably to at least about 40° C., or most preferably to at least about 80° C.

According to a preferred embodiment of the present inventive method, the compression agents comprise the rolls of a calender. In addition to the temperature, there are a number of other variables in the calendering process that can be modified according to the method of the present invention to further affect the properties of the porous membrane produced. For example, the degree of compression of the porous PTFE substrate can be varied by adjusting the gap setting or interference between the two rolls, along with the pressure at which one roll is loaded into the other. The two rolls can be separated, e.g., by about 5% to about 80% of the total thickness of the porous substrate and any superimposed fibrous sheets prior to passage through the calender. Increasing the pressure of the rolls tends to decrease the pore rating of the membrane produced. One of the rolls can preferably be loaded into the other roll at a pressure of at least about 850 N/m [about 5 pounds per linear inch (pli)]. The pressure loading more preferably ranges from about 850 (about 5 pli) to about 35,000 N/m (about 200 pli) or more, with the most preferred range being about 1750 (about 10 pli) to about 17,500 N/m (about 100 pli).

The rate at which the porous substrate passes through the calender also affects the properties of the resulting membrane. If the material passes through the calender too quickly, the pore rating is not decreased to the most desirable extent. This is particularly the case when the rolls are heated, resulting in an inadequate amount of heat being transferred to the substrate if it is passed through the calender too quickly. Advantageously, the porous PTFE substrate passes through the calender at a rate of about 1.5 m/min (about 5 ft/min) to about 150 m/min (about 500 ft/min), preferably at a rate of about 1.5 m/min (about 5 ft/min) to about 30 m/min (about 100 ft/min), and most preferably at a rate of about 1.5 m/min (about 5 ft/min) to about 20 m/min (about 65 ft/min).

Fibrous Sheets

According to alternative embodiments of the present inventive method, the porous PTFE substrate is compressed while in contact with a fibrous material. In one embodiment, a fibrous material is superimposed onto the porous substrate prior to compression (e.g., by layering the porous PTFE substrate between one or more sheets of fibrous material). The fibrous material can be superimposed on one or both sides of the PTFE substrate, and the material on each side can be the same or different. In another embodiment, a fibrous material is superimposed onto the surface of one or both of the compression agents (e.g., by securing one or more sheets of fibrous material to the surface of one or both of the compression agents). These embodiments can also be combined (i.e., a fibrous material can be superimposed onto one or both surfaces of the porous substrate and one or both of the compression agents).

In the above embodiments, one or both of the compression agents will directly contact the fibrous material(s), but not the porous substrate. By preventing one or both of the compression agents from contacting the porous substrate, the resulting porous membrane often has an improved permeability at the same pore rating compared to a porous membrane compressed in the absence of a fibrous material. It is highly preferred that the fibrous material be non-woven, as it is easier to control the relative increase in permeability of the resulting membrane using a non-woven, instead of a woven, material. The use of a woven material in the method of the present invention, tends to cause a dramatic change in the permeability of the compressed membrane, while a non-woven material generally makes incremental, minor modifications possible.

Any suitable fibrous material can be used. For example, the fibrous, preferably non-woven, material can be prepared from fibers composed of polyamides, polyaromatic amides, polyesters, polyolefins, fluoropolymers, polysulfones, cotton, asbestos, cellulose, glass, and mixtures thereof. Fibrous materials composed of thermoplastic fibers prepared from polyester and polypropylene are especially suitable for use according to the method of the present invention.

The fibrous material can be prepared from fibers having any suitable diameter. Preferred are fibrous materials composed of fibers having an average diameter of from about 1 $\mu$m to about 50 $\mu$m, more preferably from about 5 $\mu$m to about 30 $\mu$m, and most preferably from about 10 $\mu$m to about 30 $\mu$m.

Fibrous material of any suitable thickness can be used. It is preferred that each piece of fibrous material be from about 10% to about 1000% of the thickness of the porous PTFE substrate, more preferably from about 10% to about 800%, and most preferably from about 50% to about 500% of the thickness of the porous PTFE substrate. In particular, fibrous materials of from about 1 mm to about 25 mm, and more preferably from about 10 mm to about 20 mm, in thickness are particularly suitable for use according to the method of the present invention. Such fibrous materials are available from commercial sources.

Post-Modification

The porous PTFE membranes prepared according to the method of the present invention have physical properties that have been altered compared to those of the uncompressed porous substrates. In general, the porous PTFE membranes have a smaller pore rating, a lower water permeability, and a higher pressure drop ($\Delta P$) compared to the uncompressed porous substrates. Surprisingly, the membranes also often have an improved dimensional stability compared to the uncompressed substrates.

Although the method of compression can be varied to provide porous PTFE membranes with properties suitable for a wide range of applications, the physical properties of the inventive membranes can be further modified via stretching and/or sintering. The compressed membrane can be stretched in any suitable manner. For instance, the membrane can be stretched between two rollers spinning at slightly different speeds (i.e., a "fast" and a "slow" roller). The membrane can be stretched in one or more directions, and to any suitable extent.

The permeability of the porous membrane improves significantly during stretching, as evidenced by a decrease in $\Delta P$ and Gurley value, and an increase in water flow. Surprisingly, the pore rating of the membrane does not increase dramatically. This is evidenced by the fact that the titre reduction remains relatively stable over a range of stretching degrees.

Advantageously, the dimensions of the compressed, porous PTFE membrane are expanded by about 0% to about 1500% in each direction of stretching, preferably by about 5% to about 50%, and most preferably by about 10% to about 40%.

The compressed, porous PTFE membrane optionally can be sintered to any suitable level, in any suitable manner. For example, the membrane can be heated in an oven. Preferably, the membrane is sintered at a temperature of at least about 200° C., more preferably at a temperature of at least about 300° C., and most preferably at a temperature of at least about 327° C. Sintering can advantageously affect the physical properties of the porous membrane [e.g., increase tensile modulus (mechanical strength)].

The following examples further illustrate the present invention but, of course, should not be construed as in any way limiting its scope.

EXAMPLE 1

This example illustrates the preparation of a porous polytetrafluoroethylene membrane in accordance with the method of the present invention.

A porous polytetrafluoroethylene substrate (commercially available from Pall Corporation as product number TF0169, Hydrolon PTFE) with physical properties as set forth in Table 3 was superimposed on a non-woven fibrous sheet, about 150 $\mu$m in thickness, comprising polyester fibers from 14–16 $\mu$m in diameter (commercially available from Asahi as product number A05025). The superimposed materials were compressed at ambient temperature using a calender comprising a steel roll and a high durometer polyurethane roll (Beloit Supertex®90) at a rate of about 4.1 m/min (about 13.5 ft/min). There was no gap between the rolls, and the pressure loading of one roll into the other was about 5250 N/m (about 30 pli)

The $K_L$, $\Delta P$, Gurley value, water flow, and titre reduction with respect to 0.055 $\mu$m monodispersed beads of the beginning porous substrate and the resulting porous membrane were measured as described below.

The $K_L$'s of the samples were measured as described in U.S. Pat. No. 4,340,479. Briefly, the sample to be tested was wetted with 100% isopropyl alcohol and then fixed in a jig. The rate of airflow through the sample was measured as the pressure was gradually increased. The applied pressure at which the airflow suddenly and substantially increased was designated as the $K_L$.

The procedure used to measure the ΔP of the samples involved fixing a sample of the material being tested in a jig, and then measuring the differential pressure across the sample (ΔP) while maintaining an air flow rate of about 8.5 m/min (about 28 ft/min) through the sample.

The procedure used to measure the Gurley value of the samples is described in TAPPI T460om-96 and ASTM D-726-58. The instrument used for this test was a Gurley Densometer Model 4110. A sample was inserted and fixed within the densometer. The cylinder gradient was turned to the 100 ml (100 cm$^3$) line and then allowed to drop under its own weight. The time (in seconds) required for 100 ml of air to pass through the sample was recorded and reported as the Gurley value.

The following procedure was used to calculate the water flow of the samples: A circular sample of the material being tested (142 mm in diameter) was wetted by pumping 300 ml of 100% isopropyl alcohol through the sample. De-ionized water (100%) was then pumped through the sample. The first 500 ml were discarded, and during the collection of the next 500 ml, the back pressure across the membrane and the time required for the collection were noted. The back pressure and collection time were noted for the next 500 ml as well. These two data sets were averaged to provide a back pressure and water flow rate for the membrane. The water flow was then calculated according to the following formula: Water flow=water flow rate (l/hr)/area of sample tested (m$^2$)/back pressure (kPa).

The following procedure was used to measure the titre reduction of the samples: A circular disk (142 mm in diameter) of the sample to be tested was wetted first with 100% isopropyl alcohol and then soaked for 1 hour in a 0.1% (wt/vol) aqueous solution of Triton® X-100 surfactant (commercially available from J. T. Baker, product number 90022-93-1. The sample was placed in a particle measuring system (PMS M-50), and de-ionized water (filtered to remove particles larger than 0.04 μm) was pumped through the sample until a stable background level was obtained.

A 0.1% (wt/vol) solution of monodispersed 0.055 μm latex beads was prepared by diluting a 10% (wt/vol) aqueous solution of 0.055 μm dyed polystyrene latex beads (commercially available from Bangs Labs, product number D0000551PB) with a 0.1% (wt/vol) aqueous solution of Triton® X-100 surfactant.

The 0.1% bead solution was pumped through the sample until a stable upstream particle concentration was established. The sensor was then switched to measure the particle concentration downstream of the sample, and after an hour, the upstream particle concentration was rechecked. The titre reduction was reported as the average particle concentration upstream/average particle concentration downstream, and as [(average particle concentration upstream—average particle concentration downstream)/average particle concentration upstream]*100%.

The physical properties of the beginning porous substrate and the resulting porous membrane are set forth in Table 3.

TABLE 3

Physical properties of porous PTFE substrate and present inventive membrane

| Properties Tested | Porous Substrate | Inventive Membrane |
| --- | --- | --- |
| Thickness (μm) | 67.8 | 31.8 |
| $K_L$ (kPa) | 386 | 448 |
| ΔP (kPa) | 21 | 95 |
| Gurley Value (sec/100 ml) | 29 | 264 |
| Water Flow (1/hr/m$^2$/kPa) | 43 | 5.8 |
| Titre Reduction (% removal) | $10^{2.6}$ (99.75%) | $10^{3.8}$ (99.98%) |

These results show that a porous PTFE membrane prepared in accordance with the method of the present invention has a substantially improved titre reduction and $K_L$ as compared to the porous PTFE substrate from which it was prepared.

EXAMPLE 2

This example illustrates the stretching of a porous polytetrafluoroethylene membrane in accordance with the method of the present invention.

A porous polytetrafluoroethylene membrane was prepared as in Example 1. The membrane was then stretched to varying degrees (i.e., 5%, 10%, 25% and 40%) in the machine direction between slow and fast moving rolls. The $K_L$'s, ΔP's, Gurley numbers, and water flows of the expanded porous membranes were measured as in Example 1. In addition, the titre reductions with respect to 0.055 μm monodispersed beads were visually estimated as described below.

For the purpose of visually estimating titre reduction, a 0.1% (wt/vol) bead solution was prepared by diluting a 10% (wt/vol) aqueous solution of 0.055 μm dyed polystyrene latex beads (commercially available from Bangs Labs, product number D0000551PB) with a 0.1% (wt/vol) aqueous solution of Triton® X-100 surfactant (commercially available from J. T. Baker, product number 90022-93-1).

The 0.1% bead solution was pumped through a circular sample of the-material being tested (47 mm in diameter, pre-wet first with isopropyl alcohol and then a 0.1% (wt/vol) aqueous solution of Triton® X-100 surfactant at a rate of 3.3 ml/min using a syringe pump. The initial 5 ml of effluent was discarded, and the last 5 ml was collected and saved for analysis.

A series of titre reduction standards were made using the 0.1% bead solution and the 0.1% Triton® X-100 surfactant solution: (a) a $10^1$ (90%) standard consisted of a 10:1 ratio (vol/vol) of 0.1% Triton® X-100 surfactant solution to 0.1% bead solution, (b) a $10^2$ (99%) standard consisted of a 100:1 ratio (vol/vol) of 0.1% Triton® X-100 surfactant solution to 0.1% bead solution, and (c) a $10^3$ (99.9%) standard consisted of a 1000:1 ratio (vol/vol) of 0.1% Triton® X-100 surfactant solution to 0.1% bead solution.

The effluent collected was analyzed by comparing its color intensity to that of each of the titre reduction standards when the solutions were viewed against a white background. The titre reduction reported was that of the standard which was closest in intensity to that of the sample.

The physical properties of the expanded porous membrane are set forth in Table 4.

TABLE 4

Physical properties of expanded inventive membranes

| Properties Tested | Inventive Membrane Stretched by 5% | Inventive Membrane Stretched by 10% | Inventive Membrane Stretched by 25% | Inventive Membrane Stretched by 40% |
|---|---|---|---|---|
| Thickness ($\mu$m) | 32.3 | 36.6 | 39.1 | 41.9 |
| $K_L$ (kPa) | 443 | 303 | 241 | 200 |
| $\Delta P$ (kPa) | 91 | 81 | 71 | 64 |
| Gurley Value (sec/100 ml) | 230 | 170 | 165 | 161 |
| Water Flow (1/hr/m$^2$/kPa) | 6.2 | 8.1 | 9.6 | N/D |
| Titre Reduction (% removal) | $10^3$ (99.9%) | $10^3$ (99.9%) | $10^3$ (99.9%) | $10^2$ (99%) |

N/D: Not determined because stretched membrane was too narrow for the testing instrument These data show that a porous PTFE membrane that has been prepared in accordance with the present invention can be stretched to significantly increase its permeability, without substantially reducing its particle removal efficiency. Thus, the $\Delta P$ and Gurley value decreased, and the water flow increased, as the present inventive membrane was stretched from 5 to 40%. A significant reduction in particle removal efficiency (titre reduction) was not observed until the membrane was stretched by at least 40%.

EXAMPLE 3

This example illustrates the improved mechanical stability of a porous polytetrafluoroethylene membrane prepared in accordance with the method of the present invention.

Two porous polytetrafluoroethylene membranes were prepared as in Example 1. The membranes and the porous substrates from which they were prepared were then heated at 120° C. for two hours. The substrates and membranes were either restrained during heating to prevent them from shrinking, or heated while unrestrained. The $K_L$'s, $\Delta P$'s, Gurley numbers, and water flows of the substrates and membranes were measured after heating as in Example 1, and are set forth in Table 5. The titre reductions with respect to 0.055 $\mu$m monodispersed particles were estimated as described in Example 2, and are also set forth in Table 5.

TABLE 5

Dimensional stability of porous PTFE substrate and present inventive membrane after heating for two hours at 120° C. while restrained

| Properties Tested | Porous Substrate (restrained) | Inventive Membrane (restrained) | Porous Substrate (unrestrained) | Inventive Membrane (unrestrained) |
|---|---|---|---|---|
| Visible Shrinkage | — | — | 25–50% | ≤5% |
| $K_L$ (kPa) | 400 | 400 | N/D | 462 |
| $\Delta P$ (kPa) | 21 | 95 | N/D | 95 |
| Gurley Value (sec/100 ml) | 21 | 242 | 270 | 520 |
| Water Flow (1/hr/m$^2$/kPa) | 47 | 6 | N/D | 3.7 |
| Titre Reduction (% removal) | 0 (0%) | $10^3$ (99.9%) | N/D | $10^3$ (99.9%) |

N/D: Not determined because area of shrunken substrate was too small for the testing instrument These data, when compared to the data in Table 3, reveal that the respective physical properties of the porous substrate and the present inventive membrane are not significantly altered during heating while restrained to prevent shrinkage. Moreover, these data, when compared to the data in Table 3, reveal that heating the porous substrate while unrestrained causes it to shrink significantly, which decreases its permeability as evidenced by a substantially increased Gurley value. Conversely, the present inventive membrane undergoes little if any shrinkage upon being heated unrestrained, and most of its physical properties (e.g., $K_L$, $\Delta P$, and titre reduction) remain unchanged.

EXAMPLE 4

This example illustrates the improved mechanical stability of an expanded porous polytetrafluoroethylene membrane prepared in accordance with the method of the present invention.

A series of porous polytetrafluoroethylene membranes were prepared and stretched as in Example 2. The membranes were then heated at 120° C. for two hours while restrained to prevent them from shrinking. The $K_L$'s, $\Delta P$'s, Gurley numbers, and water flows of the membranes were measured after heating as in Example 1, and are set forth in Table 6. The titre reductions with respect to 0.055 $\mu$m monodispersed particles were estimated as described in Example 2, and are also set forth in Table 6.

TABLE 6

Dimensional stability of expanded inventive membranes after heating for two hours at 120° C. while restrained

| Properties Tested | Inventive Membrane Stretched by 5% | Inventive Membrane Stretched by 10% | Inventive Membrane Stretched by 25% | Inventive Membrane Stretched by 40% |
|---|---|---|---|---|
| $K_L$ (kPa) | 434 | 421 | 379 | N/D |
| $\Delta P$ (kPa) | 95 | 85 | 74 | N/D |
| Gurley Value (sec/100 ml) | 250 | 214 | 170 | 150 |
| Water Flow (1/hr/m$^2$/kPa) | 5.9 | 6.7 | 7.9 | N/D |
| Titre Reduction (% removal) | $10^3$ (99.9%) | $10^3$ (99.9%) | $10^3$ (99.9%) | $10^2$ (99.9%) |

N/D: Not determined because stretched membrane was too narrow for the testing instrument These data, when compared to the data in Table 4, reveal that the present inventive membranes, after being stretched by about 5% to at about 40%, can be heated while restrained to a temperature of at least about 120° C. without significantly impacting their physical properties. In other words, the titre reductions, water flows, etc. of the stretched membranes do not change significantly during heating.

All of the references cited herein, including patents, patent applications, and publications, are hereby incorporated in their entireties by reference.

While this invention has been described with an emphasis upon preferred embodiments, it will be obvious to those of ordinary skill in the art that variations of the preferred embodiments may be used and that it is intended that the invention may be practiced otherwise than as specifically described herein. Accordingly, this invention includes all modifications encompassed within the spirit and scope of the invention as defined by the following claims.

What is claimed is:

1. A non-fused porous polytetrafluoroethylene membrane having a titre reduction of at least about $10^3$ when challenged with 0.055 µm monodispersed beads and a water permeability of at least about 5 l/hr/m²/kPa.

2. The non-fused porous polytetrafluoroethylene membrane of claim 1, wherein said membrane is unsintered.

3. The non-fused porous polytetrafluoroethylene membrane of claim 1, wherein the membrane is prepared according to a method comprising providing a substrate consisting essentially of polytetrafluoroethylene, stretching said substrate to introduce pores in said substrate such that said substrate is characterized by a first pore rating, and compressing said substrate between two compression agents to provide a porous polytetrafluoroethylene membrane having a second pore rating, wherein said second pore rating is smaller than said first pore rating.

4. The non-fused porous polytetrafluoroethylene membrane of claim 3, wherein said second pore rating is less than about 90% of said first pore rating.

5. The non-fused porous polytetrafluoroethylene membrane of claim 4, wherein said second pore rating is less than about 75% of said first pore rating.

6. The non-fused porous polytetrafluoroethylene membrane of claim 5, wherein said second pore rating is less than about 50% of said first pore rating.

7. The non-fused porous polytetrafluoroethylene membrane of claim 3, wherein said substrate is unsintered.

8. The non-fused porous polytetrafluoroethylene membrane of claim 1, wherein said porous polytetrafluoroethylene membrane has a titre reduction of at least about $10^4$ when challenged with 0.055 µm monodispersed beads.

9. The non-fused porous poytetrafluoroethylene membrane of claim 1, wherein said porous polytetrafluoroethylene membrane has a water permeability of at least about 10 l/hr/m²/kPa.

10. The non-fused porous polytetrafluoroethylene membrane of claim 1, wherein said porous polytetrafluoroethylene membrane has original dimensions, and is stretched in one or more directions to provide an expanded porous polytetrafluoroethylene membrane having final dimensions, wherein said final dimensions are greater than said original dimensions in the direction or directions of stretching.

11. The non-fused porous polytetrafluoroethylene membrane of claim 10, wherein said final dimensions are from about 5% to about 50% greater than said original dimensions in each direction of stretching.

12. The non-fused porous polytetrafluoroethylene membrane of claim 11, wherein said final dimensions are from about 10% to about 40% greater than said original dimensions in each direction of stretching.

13. The non-fused porous polytetrafluoroethylene membrane of claim 1, wherein said porous polytetrafluoroethylene membrane is sintered at a temperature of at least about 327° C.

14. The non-fused porous polytetrafluoroethylene membrane of claim 1, wherein said porous polytetrafluoroethylene membrane shrinks by less than about 5% when heated unrestrained for two hours at a temperature of about 120° C.

15. The non-fused porous polytetrafluoroethylene membrane of claim 1, wherein the pressure drop across said membrane at an airflow of 8.5 m/min is less than about 100 kPa.

* * * * *